(12) United States Patent
Lair et al.

(10) Patent No.: US 12,003,384 B2
(45) Date of Patent: Jun. 4, 2024

(54) EFFICIENT HANDLING OF COLLECTED DATA OR ANALYTICS DATA IN NETWORK DATA ANALYTICS FUNCTION SCENARIOS

(71) Applicant: NOKIA TECHNOLOGIES OY, Espoo (FI)

(72) Inventors: Yannick Lair, Voisins le Bretonneux (FR); Anja Jerichow, Munich (DE); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/624,627

(22) PCT Filed: Jul. 1, 2020

(86) PCT No.: PCT/EP2020/068533
§ 371 (c)(1),
(2) Date: Jan. 4, 2022

(87) PCT Pub. No.: WO2021/004859
PCT Pub. Date: Jan. 14, 2021

(65) Prior Publication Data
US 2022/0263724 A1 Aug. 18, 2022

Related U.S. Application Data

(60) Provisional application No. 62/870,977, filed on Jul. 5, 2019.

(51) Int. Cl.
*H04L 41/142* (2022.01)
*H04L 41/147* (2022.01)
*H04L 43/04* (2022.01)

(52) U.S. Cl.
CPC ........ *H04L 41/142* (2013.01); *H04L 41/147* (2013.01); *H04L 43/04* (2013.01)

(58) Field of Classification Search
CPC ...... H04L 41/142; H04L 41/147; H04L 43/04
See application file for complete search history.

(56) References Cited

U.S. PATENT DOCUMENTS

| | | | |
|---|---|---|---|
| 2013/0024615 A1* | 1/2013 | Cordella | G06F 16/137 711/E12.019 |
| 2015/0023170 A1* | 1/2015 | Kakadia | H04L 43/08 370/242 |

(Continued)

FOREIGN PATENT DOCUMENTS

| | | |
|---|---|---|
| WO | WO 2018/118001 A1 | 6/2018 |
| WO | WO 2019/032968 A1 | 2/2019 |

OTHER PUBLICATIONS

"3rd Generation Partnership Project; Technical Specification Group Services and System Aspects; Architecture enhancements for 5G System (5GS) to support network data analytics services (Release 16)", 3GPP TS 23.288 v1.0.0 (May 2019), 52 pages.

(Continued)

*Primary Examiner* — Bryan Y Lee
(74) *Attorney, Agent, or Firm* — ALSTON & BIRD LLP

(57) ABSTRACT

According to one example embodiment, a method may include receiving, by a repository entity, first information on data related to a network entity. The method may further include storing, by the repository entity, second information related to the network entity based on the first information. The second information may include at least one of an identifier of the network entity and an identifier of a data acquiring entity having acquired the data.

15 Claims, 16 Drawing Sheets

(56) References Cited

U.S. PATENT DOCUMENTS

2020/0252813 A1* 8/2020 Li .................... G06Q 20/382
2022/0201534 A1* 6/2022 Wang ................ H04W 24/04

OTHER PUBLICATIONS

"3rd Generation Partnership Project; Technical Specification Group Services and System Aspects; Procedures for the 5G System; Stage 2 (Release 16)", 3GPP TS 23.502 v16.0.0, (Mar. 2019), 420 pages.

"3rd Generation Partnership Project; Technical Specification Group Services and System Aspects; Procedures for the 5G System; Stage 2 (Release 16)", 3GPP TS 23.502 v16.1.1, (Jun. 2019), 495 pages.

"3rd Generation Partnership Project; Technical Specification Group Services and System Aspects; Study of Enablers for Network Automation for 5G (Release 16)", 3GPP TR 23.791 v16.1.0, (Mar. 2019), 124 pages.

"3rd Generation Partnership Project; Technical Specification Group Services and System Aspects; Study of Enablers for Network Automation for 5G (Release 16)", 3GPP TR 23.791 v16.2.0, (Jun. 2019), 124 pages.

"3rd Generation Partnership Project; Technical Specification Group Services and System Aspects; System Architecture for the 5G System; Stage 2 (Release 16)", 3GPP TS 23.501 v16.0.0, (Mar. 2019), 318 pages.

International Search Report and Written Opinion for Patent Cooperation Treaty Application No. PCT/EP2020/068533 dated Dec. 2, 2020.

SA WG2, "New SID: Study on Enablers for Network Automation for 5G—phase 2", 3GPP TSG SA Meeting #84, SP-190557, (Jun. 5-7, 2019), 4 pages.

Office Action for European Application No. 20736641.0 dated Feb. 22, 2023, 5 pages.

* cited by examiner

EFFICIENT HANDLING OF COLLECTED DATA OR ANALYTICS DATA IN NETWORK DATA ANALYTICS FUNCTION SCENARIOS

CROSS-REFERENCE TO RELATED APPLICATIONS

This application is a national phase entry of International Application No. PCT/EP2020/068533, filed Jul. 1, 2020, which claims the benefit of U.S. Provisional Application No. 62/870,977, filed Jul. 5, 2019. The entire content of the above-referenced application is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for efficient handling of collected data or analytics data in network data analytics function scenarios.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include receiving, by a repository entity in a mobile communication network, first information on data related to a network entity. The method may further include deriving and storing, by the repository entity, second information related to the network entity, as exposure data, based on the first information. The second information may include an identifier of the network entity, and an identifier of a data acquiring entity having acquired the data related to the network entity.

In accordance with certain embodiments, an apparatus may include means for receiving first information on data related to a network entity. The apparatus may further include means for deriving and storing second information related to the network entity, as exposure data, based on the first information. The second information may include an identifier of the network entity, and an identifier of a data acquiring entity having acquired the data related to the network entity.

In accordance with various embodiments, an apparatus may include at least one processor and at least one memory including computer program code. The at least one memory and the computer program code may be configured to, with the at least one processor, cause the apparatus to at least receive first information on data related to a network entity. The at least one memory and the computer program code may be further configured to, with the at least one processor, cause the apparatus to at least derive and store second information related to the network entity, as exposure data, based on the first information. The second information may include an identifier of the network entity, and an identifier of a data acquiring entity having acquired the data related to the network entity.

In accordance with some embodiments, a non-transitory computer readable medium may be encoded with instructions that may, when executed in hardware, perform a method. The method may include receiving first information on data related to a network entity. The method may further include deriving and storing second information related to the network entity, as exposure data, based on the first information. The second information may include an identifier of the network entity, and an identifier of a data acquiring entity having acquired the data related to the network entity.

In accordance with certain embodiments, a computer program product may perform a method. The method may include receiving first information on data related to a network entity. The method may further include deriving and storing second information related to the network entity, as exposure data, based on the first information. The second information may include an identifier of the network entity, and an identifier of a data acquiring entity having acquired the data related to the network entity.

In accordance with various embodiments, an apparatus may include circuitry configured to receive first information on data related to a network entity. The circuitry may further be configured to derive and store second information related to the network entity, as exposure data, based on the first information. The second information may include an identifier of the network entity, and an identifier of a data acquiring entity having acquired the data related to the network entity.

In accordance with some embodiments, a method may include receiving, by a repository entity in a mobile communication network, first information on data related to a network entity. The method may further include deriving and storing, by the repository entity, second information related to the network entity, as exposure data, based on the first information. The second information may include an identifier of the network entity, and at least one pointer to a storage location of the data.

In accordance with certain embodiments, an apparatus may include means for receiving first information on data related to a network entity. The apparatus may further include means for deriving and storing second information related to the network entity, as exposure data, based on the first information. The second information may include an identifier of the network entity, and at least one pointer to a storage location of the data.

In accordance with various embodiments, an apparatus may include at least one processor and at least one memory including computer program code. The at least one memory and the computer program code may be configured to, with the at least one processor, cause the apparatus to at least receive first information on data related to a network entity. The at least one memory and the computer program code may be further configured to, with the at least one processor, cause the apparatus to at least derive and store second information related to the network entity, as exposure data, based on the first information. The second information may include an identifier of the network entity, and at least one pointer to a storage location of the data.

In accordance with some embodiments, a non-transitory computer readable medium may be encoded with instructions that may, when executed in hardware, perform a method. The method may include receiving first information on data related to a network entity. The method may further include deriving and storing second information related to the network entity, as exposure data, based on the first information. The second information may include an identifier of the network entity, and at least one pointer to a storage location of the data.

In accordance with certain embodiments, a computer program product may perform a method. The method may include receiving first information on data related to a network entity. The method may further include deriving and storing second information related to the network entity, as exposure data, based on the first information. The second information may include an identifier of the network entity, and at least one pointer to a storage location of the data.

In accordance with various embodiments, an apparatus may include circuitry configured to receive first information on data related to a network entity. The circuitry may further be configured to derive and store second information related to the network entity, as exposure data, based on the first information. The second information may include an identifier of the network entity, and at least one pointer to a storage location of the data.

In accordance with some embodiments, a method may include transmitting, by a first network entity in a mobile communication network, to a repository entity, an information retrieval request indicative of a second network entity to be analyzed. The method may further include at least one of receiving, from the repository entity, information on a data acquiring entity having acquired data related to the second network entity, and receiving, from the repository entity, at least one pointer to a storage location of the data related to the second network entity.

In accordance with certain embodiments, an apparatus may include means for transmitting, to a repository entity, an information retrieval request indicative of a second network entity to be analyzed. The apparatus may further include means for at least one of receiving, from the repository entity, information on a data acquiring entity having acquired data related to the second network entity, and receiving, from the repository entity, at least one pointer to a storage location of the data related to the second network entity.

In accordance with various embodiments, an apparatus may include at least one processor and at least one memory including computer program code. The at least one memory and the computer program code may be configured to, with the at least one processor, cause the apparatus to at least transmit, to a repository entity, an information retrieval request indicative of a second network entity to be analyzed. The at least one memory and the computer program code may be further configured to, with the at least one processor, cause the apparatus to at least one of receive, from the repository entity, information on a data acquiring entity having acquired data related to the second network entity, and receive, from the repository entity, at least one pointer to a storage location of the data related to the second network entity.

In accordance with some embodiments, a non-transitory computer readable medium may be encoded with instructions that may, when executed in hardware, perform a method. The method may include transmitting, to a repository entity, an information retrieval request indicative of a second network entity to be analyzed. The method may further include at least one of receiving, from the repository entity, information on a data acquiring entity having acquired data related to the second network entity, and receiving, from the repository entity, at least one pointer to a storage location of the data related to the second network entity.

In accordance with certain embodiments, a computer program product may perform a method. The method may include transmitting, to a repository entity, an information retrieval request indicative of a second network entity to be analyzed. The method may further include at least one of receiving, from the repository entity, information on a data acquiring entity having acquired data related to the second network entity, and receiving, from the repository entity, at least one pointer to a storage location of the data related to the second network entity.

In accordance with various embodiments, an apparatus may include circuitry configured to transmit, to a repository entity, an information retrieval request indicative of a second network entity to be analyzed. The circuitry may further be configured to at least one of receive, from the repository entity, information on a data acquiring entity having acquired data related to the second network entity, and receive, from the repository entity, at least one pointer to a storage location of the data related to the second network entity.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enabling and realizing efficient handling of collected data or analytics data in network data analytics function scenarios is not intended to limit the scope of certain embodiments, but is instead representative of selected example embodiments.

As noted above, some example embodiments described herein relate to efficient handling of collected data or analytics data in network data analytics function scenarios. These measures for realizing efficient handling of collected data or analytics data may include measures for efficient sharing of such collected data or analytics data in network data analytics function scenarios, particularly by allowing efficient storage and distribution of and access to the collected data or analytics data.

Figure 1:
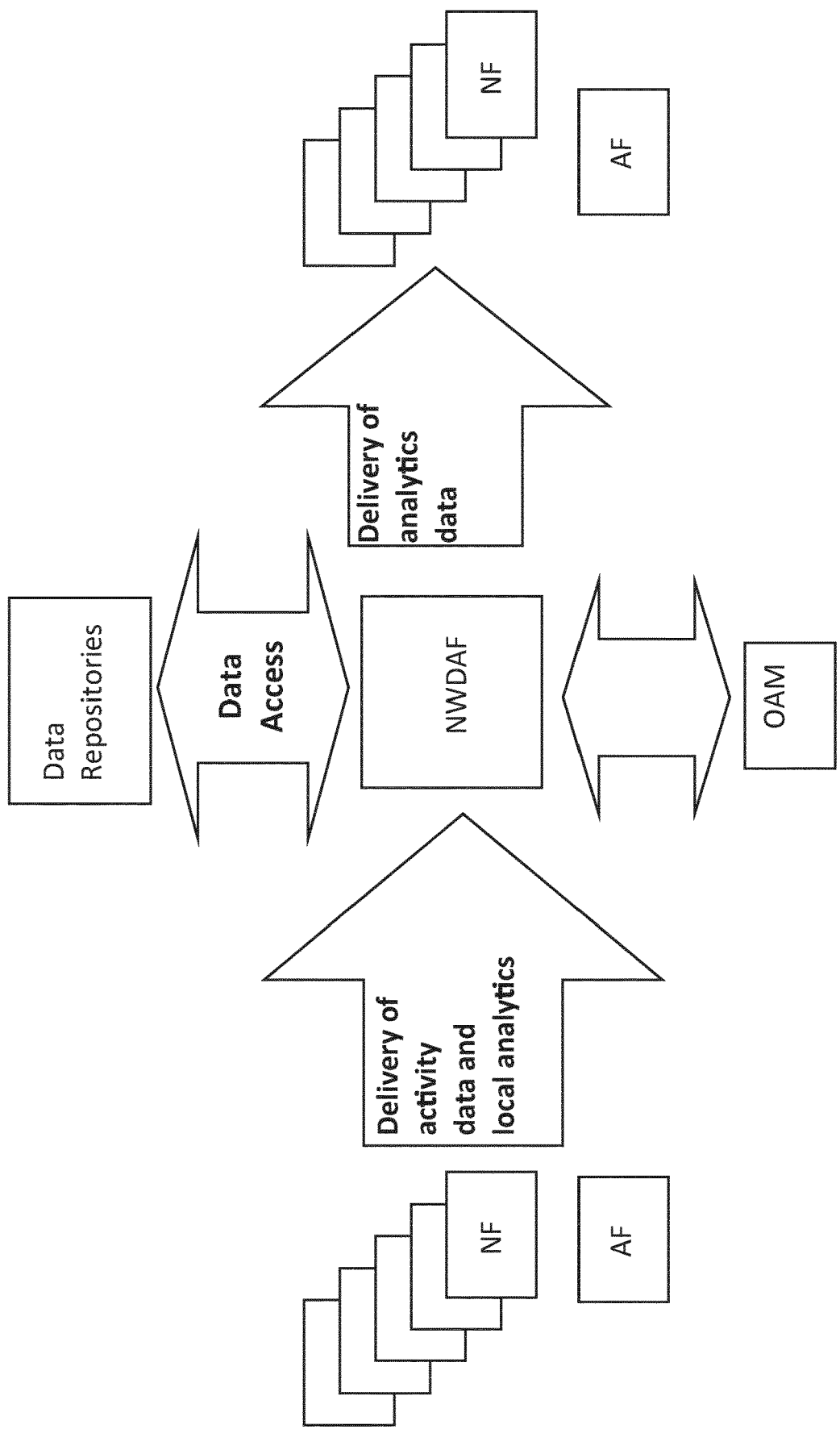
FIG. 1 illustrates a block diagram illustrating a general framework for 5G network automation.

Third Generation Partnership Project (3GPP) SA2 Release (Rel)-16 considers Regarding Enablers for Network Automation (eNA) by building on network data analytics functions (NWDAF) and services defined in Rel-15. FIG. 1 illustrates a general framework for 5G network automation, where a NWDAF may interact with different entities in the 5G system for different purposes. For example, the NWDAF may interact with 5G core (5GC) network functions (NF) (e.g., access management function (AMF), session management function (SMF), policy control function (PCF), unified data management (UDM)), application functions (AF) (directly or via network exposure function (NEF)), and operation, administration, and maintenance (OAM) for data collection. The NWDAF may also interact with data repositories for retrieval of specific information, e.g., with user data repository (UDR) via UDM for subscriber-related information. Additionally or alternatively, the NWDAF may retrieve information about NFs, e.g., NRF for NF-related information, retrieve information about network slice selection functions (NSSF) for slice-related information, and/or may provide analytics to consumers upon request from the consumers.

Analytics information provided by a NWDAF may include statistical information of past events and/or predictive information for the future. At least one instance of a NWDAF may be deployed in a public land mobile network (PLMN). When multiple NWDAF instances are deployed, the architecture supports deploying the NWDAF as a central NF, as a collection of distributed NFs, or as a combination of both. But when multiple NWDAFs exist, each NWDAF does not need to be able to provide the same type of analytics results; thus, some NWDAFs may specialize in providing certain types of analytics. An analytics ID information element may be used to identify the type of supported analytics that a particular NWDAF may generate.

In order to support NFs that consume analytics with the discovery of a NWDAF instance capable of providing some specific type of analytics, each NWDAF instance may provide the list of analytics ID(s) that it supports when registering to the network repository function (NRF), in addition to other NRF registration elements of the NF profile. Other NFs requiring the discovery of an NWDAF instance that provide support for some specific type of analytics may query the NRF and/or may include the analytics ID(s) identifying the desired type of analytics for that purpose.

Figure 2:
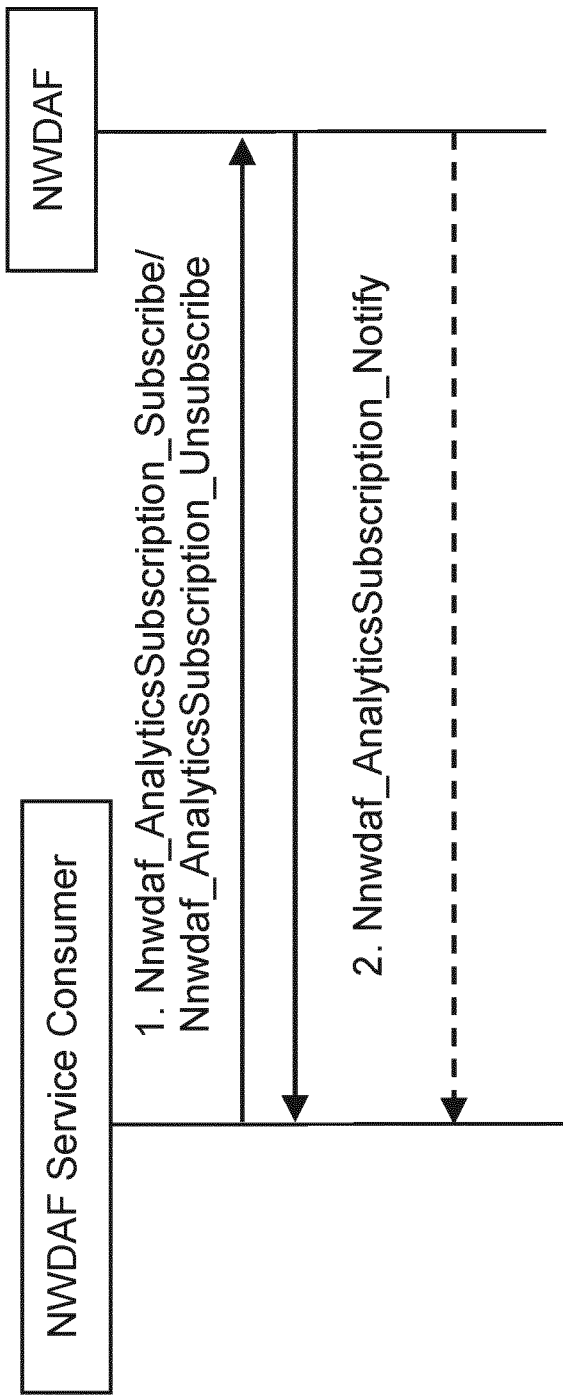
FIG. 2 illustrates a schematic diagram of signaling sequences for subscription and un-subscription of network data analytics.
Figure 3:
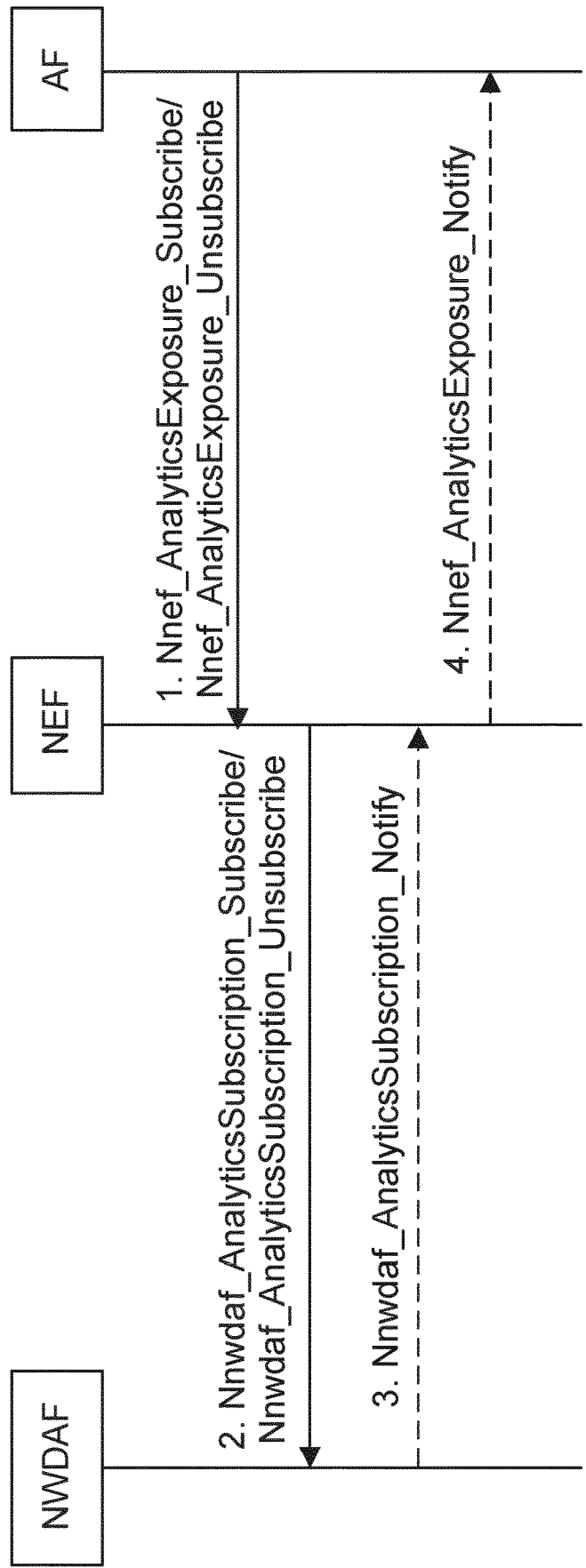
FIG. 3 illustrates a schematic diagram of signaling sequences for subscription and un-subscription of network data analytics by application functions via a network exposure function.
Figure 4:
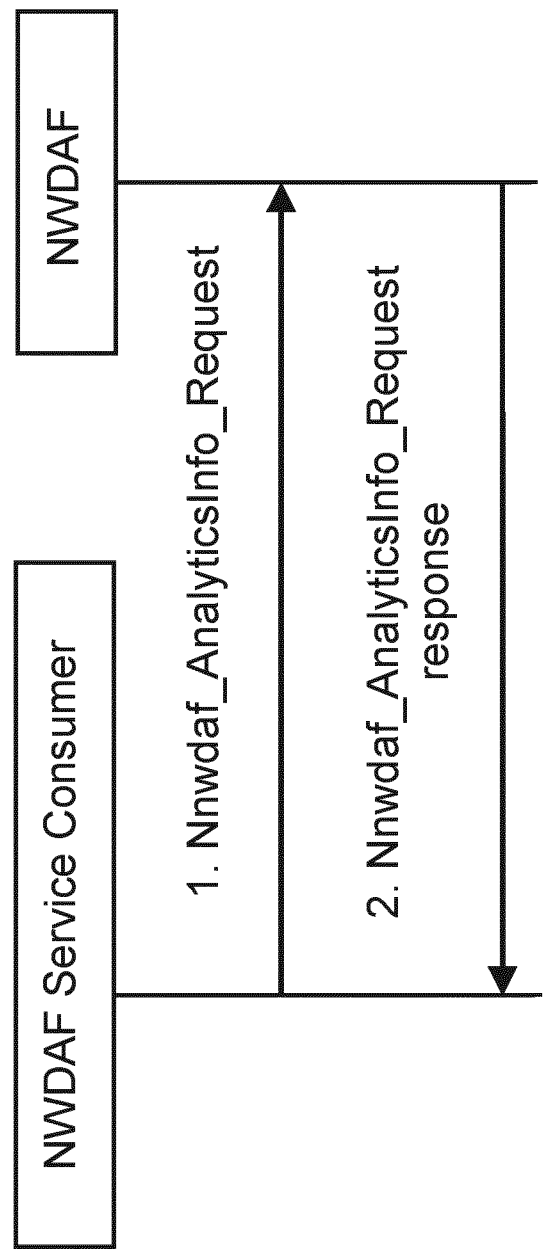
FIG. 4 illustrates a schematic diagram of signaling sequences for requesting network data analytics.
Figure 5:
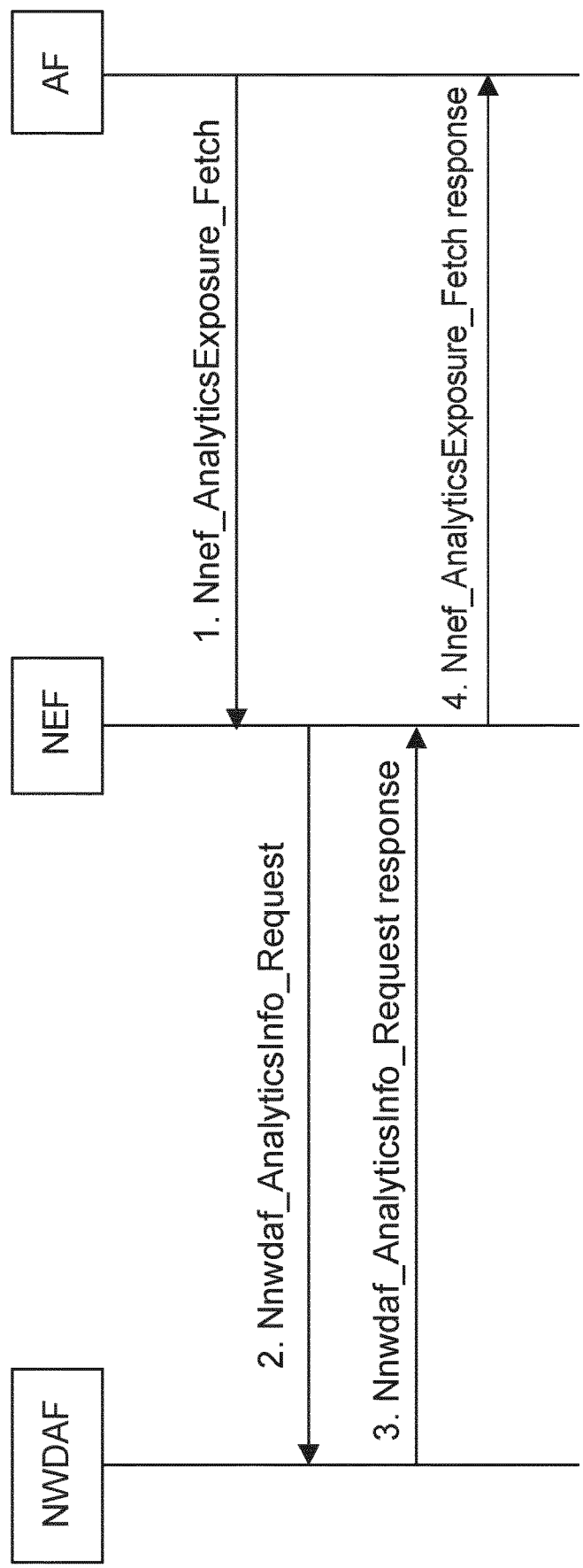
FIG. 5 illustrates a schematic diagram of signaling sequences for requesting network data analytics by application functions via a network exposure function.

An analytics consumer, such as a 5GC NF, AF, and OAM, in order to request analytics, may either subscribe to analytics from a NWDAF in order to be notified of analytics as described in FIG. 2 (or FIG. 3 when the AF subscribes to analytics via NEF), or can request analytics as described in FIG. 4 (or FIG. 5 when the AF requests analytics via NEF). While FIGS. 2 and 4 illustrate a NWDAF service consumer as an example for such an analytics consumer, an analytics consumer is not limited to only be an NWDAF service consumer.

When subscribing to or requesting analytics from a NWDAF, the analytics consumer may provide the following information:

Contents of Analytics Exposure

The NFs/AF/OAM subscribing (using Nnwdaf_AnalyticsSubscription) or requesting (using Nnwdaf_AnalyticsInfo) analytics to NWDAF should contain:

Analytic ID: One or multiple Analytic ID(s)

Analytic Filter Information: This set of parameter types and values enables selection of which types of analytics information are requested (e.g., subsets of all available analytics produced by NWDAF for the given Analytic ID value).

Target of Analytic Reporting: The object targeted by analytics/predictions (UE, group of UEs, any UEs). The target of analytic reporting indicates entities such as specific UEs, a group of UE(s) or any UE (i.e., all UEs).

A Notification Target Address (+ Notification Correlation ID), allowing correlation of notifications received from NWDAF with this subscription.

Analytic Reporting Information with the following parameters:

Parameters.

Observation period: time interval [start . . . end] covered by the computation, either in the past or in the future, expressed as positive or negative offsets to the present. An interval in the past is a request for statistics. An interval in the future is a request for predictions. A default value means statistics in the recent past, with a time range defined by the NWDAF.

Preferred level of accuracy of the analytics (e.g., Low/ High).

In 3GPP Rel-16, the NWDAF may provide UE related analytics including UE mobility analytics, UE communication analytics, expected UE behavioral parameters related network data analytics, and/or abnormal behavior related network data analytics.

Figure 6:
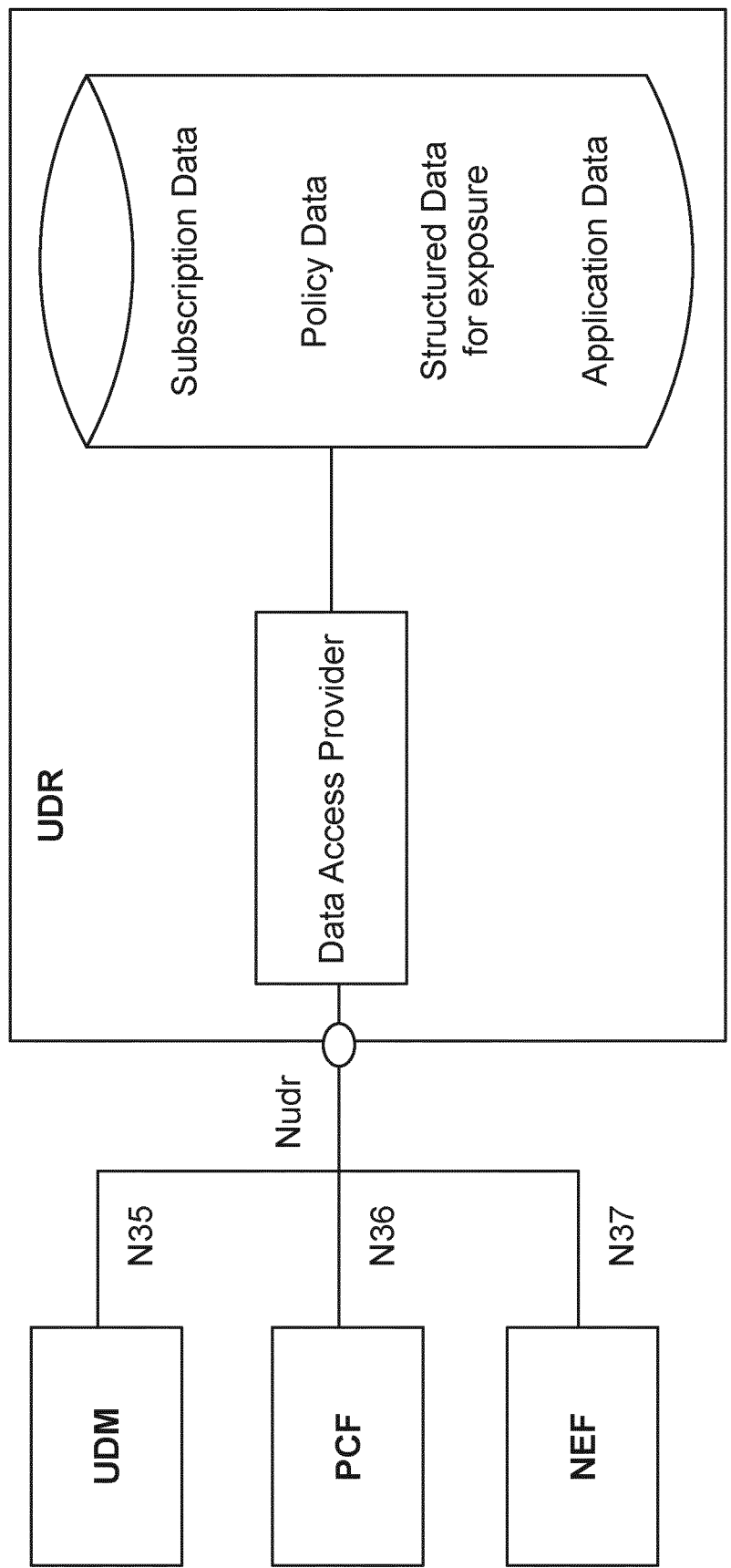
FIG. 6 illustrates a block diagram illustrating a 5GS data storage architecture.

FIG. 6 presents a block diagram illustrating a 5GS data storage architecture. 5G system (5GS) architecture allows the UDM, PCF, and NEF to store data in the UDR, including subscription data and policy data by the UDM and PCF, and/or structured data for exposure and application data (including packet flow descriptions (PFD) for application detection, AF request information for multiple UEs) by the NEF. There may be multiple UDRs deployed in the network, each of which may accommodate different data sets or subsets (e.g., subscription data, subscription policy data, data for exposure, application data) and/or serve different sets of NFs. Deployments where a UDR serves a single NF and stores its data, and, thus, can be integrated with this NF, may be possible.

A Nudr interface may be defined for the network functions (i.e., NF service consumers), such as UDM, PCF and NEF, to access a particular set of the data stored, and to read, update (including add/modify), delete, and subscribe to notifications of relevant data changes in the UDR. Each NF service consumer accessing the UDR, via Nudr, may be able to add, modify, update, and/or delete only the data it is authorized to change. This authorization may be performed by the UDR on a per data set, a NF service consumer basis, and/or on a per UE subscription granularity. UDR sets exposed via Nudr to the respective NF service consumer and stored may include standardized data such as subscription data, policy data, structured data for exposure, and application data, including PFDs for application detection and AF request information for multiple UEs.

Structured data for exposure may include information that can be stored per UE, or per UE and protocol data unit (PDU) session, and that may be accessed later on by any NF. Exposure data stored in the UDR may be configured similar to the following:

| Category | Information | Description | Data key | Data Sub key |
|---|---|---|---|---|
| Access and mobility information | UE location | Gives the Location or the last known location of a UE (e.g. Tai, Cell Id . . . both 3GPP and non-3GPP access location) | SUPI or GPSI | |
| | UE time zone | Current time zone for the UE | SUPI or GPSI | |
| | UE Access type | 3GPP access or non-3GPP access | SUPI or GPSI | |
| | UE RAT type | E-UTRA, NB-IoT or NR | SUPI or GPSI | |
| | UE registration state | Registered or Deregistered | SUPI or GPSI | |
| | UE connectivity state | IDLE or CONNECTED | SUPI or GPSI | |
| | UE reachability status | It indicates if the UE is reachable for sending either SMS or downlink data to the UE, which is detected when the UE transitions to CM-CONNECTED state or when the UE will become reachable for paging, e.g., Periodic Registration Update timer | SUPI or GPSI | |
| | UE SMS over NAS service status | SMS over NAS supported or not in the UE | SUPI or GPSI | |
| | UE Roaming status | It indicates UE's current roaming status (the serving PLMN and/or whether the UE is in its HPLMN) | SUPI or GPSI | |
| | UE Current PLMN | Current PLMN for the UE | SUPI or GPSI | |
| Session management information | UE IP address | UE IP address | SUPI or GPSI | PDU session ID or DNN |
| | PDU session status | Active/released | SUPI or GPSI | PDU session ID or DNN or UE IP address |
| | DNAI | DNAI | SUPI or GPSI | PDU session ID or DNN or UE IP address |

-continued

| Category | Information | Description | Data key | Data Sub key |
|---|---|---|---|---|
| | N6 traffic routing information | N6 traffic routing information | SUPI or GPSI | PDU session ID or DNN or UE IP address |

The storage of data collected by NWDAFs, and the storage of analytics derived by NWDAFs, have not been addressed in 3GPP specifications. 3GPP only proposes that historical information for UEs (e.g., UE location or communication related information) is stored in a UDR and then retrieved by NWDAF entities willing to collect data for these UEs to derive specific analytics. However, 3GPP Rel-16 did not further develop this approach because UDRs would need to be dimensioned for long-term data lake storing of massive amounts of data, and that signaling towards UDR would be heavy for data collection as well as data retrieval from the NWDAF.

With multiple NWDAFs in one network, some NWDAFs may work on similar types of analytics for a specific UE, for example, there may be several NWDAFs working on UE mobility analytics or UE communication analytics for a specific UE at different points in time. However, there is no mechanism known for these NWDAFs to exchange information related to UE analytics such that one NWDAF may benefit from analytics provided by another NWDAF Similarly, with multiple NWDAFs in one network, multiple NWDAFs may collect the same type of information at different points in time. But again, no techniques exist for these NWDAFs to exchange such collected data.

3GPP describes using UDRs for analytics in a generic way, indicating that a NWDAF may access network data from data repositories. With respect to storing analytical results in the UDR for predictable UE information, the NWDAF may perform data analysis on historical UE mobility information obtained from the OAM. The analytical result on UE mobility, e.g., UE mobility pattern, may be provided to the PCF. The PCF may then store the analytical result in the UDR as the predictable UE mobility information, allowing other NFs to retrieve the UE mobility information directly, i.e., without consulting the NWDAF.

As mentioned previously, storing analytical results or storing historical data in the UDR may result in the UDR needing to be dimensioned for a long-term data lake storing of massive amount of data, leaving unresolved how to store analytics and collected data. While the UDR may be used for UE related data, the UDR is not ideal to become a data lake. Thus, it would be beneficial to utilize mechanisms for NWDAFs to exchange information related to UE analytics so that one NWDAF may benefit from analytics provided by another NWDAF and mechanisms for NWDAFs to exchange collected data.

Certain embodiments described herein may have various benefits and/or advantages to overcome the disadvantages described above. For example, certain embodiments may exchange information related to UE analytics such that one NWDAF may benefit from analytics provided by another NWDAF and mechanisms for NWDAFs to exchange collected data. Furthermore, efficient handling of collected data or analytics data in network data analytics function scenarios may be provided. Thus, certain embodiments discussed below are directed to improvements in computer-related technology.

Some embodiments described herein generally provide measures and mechanisms for (enabling/realizing) efficient handling of collected data or analytics data in network data analytics function scenarios. It is assumed that there is not a single data storage entity for all analytics; instead, each NWDAF may have its own data storage entity and/or may be connected to a specific data storage entity. While some embodiments discussed herein may not exclude using UDR storage, other embodiments may not use such UDR storage.

In various embodiments, a list of NWDAF entities having analytics information for a specific UE or having collected data for a specific UE may be stored in a repository. For example, with some UEs, and per analytics, a list of NWDAF entities (e.g., NWDAF NF identity, NWDAF Internet protocol (IP) address, NWDAF fully qualified domain name (FQDN)) having derived these analytics for this UE may be stored, wherein this list may optionally be stored together with a timestamp indicating when these analytics were generated. Other stored information may include details on whether the analytics were statistics, predictions, or both, and/or observation periods for which these analytics were derived. Additionally or alternatively, with some UEs, a list of NWDAF entities (e.g., NWDAF NF identity, NWDAF IP address, NWDAF FQDN) having collected data for this UE may indicate the type of collected data that may be stored. A period over which data was collected may also be stored. In addition, stored information may be stored in an NWDAF, a UDR, and/or any other repository, but is not limited to these exemplary storage locations.

In various embodiments, rather than storing all UE historical data or UE analytical results, the reference to entities which can provide useful information related to a UE, including analytical results and collected data, may be stored. These entities may be NWDAFs, but could be any other type of 5G NF or AF. Similarly, instead of storing all UE historical data or UE analytical results, pointer information on exposure data could be stored in a data repository, such as within UDR exposure data, within third party/specific data repository for analytics purpose, and/or within a central NWDAF. Additionally or alternatively, a Nudr service may be used to provide to a UDR, or retrieve from the UDR, the exposure data (or pointer to the exposure data) stored according to some embodiments described below.

Figure 7:
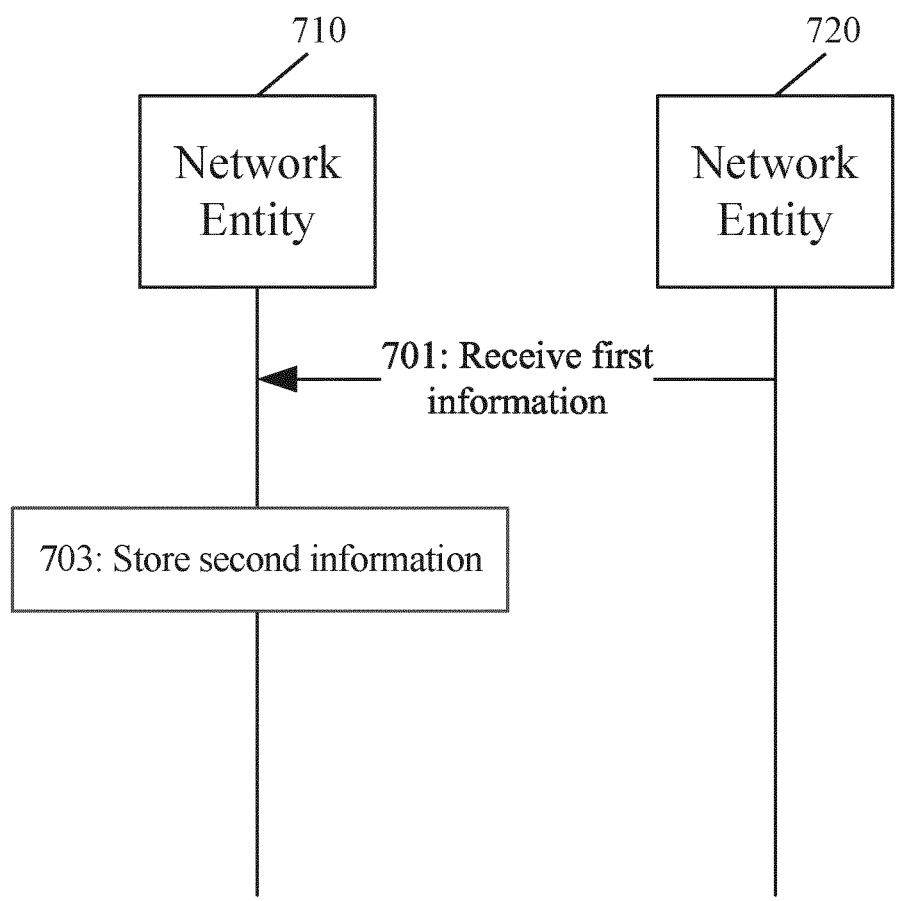
FIG. 7 illustrates an example of a signaling diagram according to certain embodiments.
Figure 15:
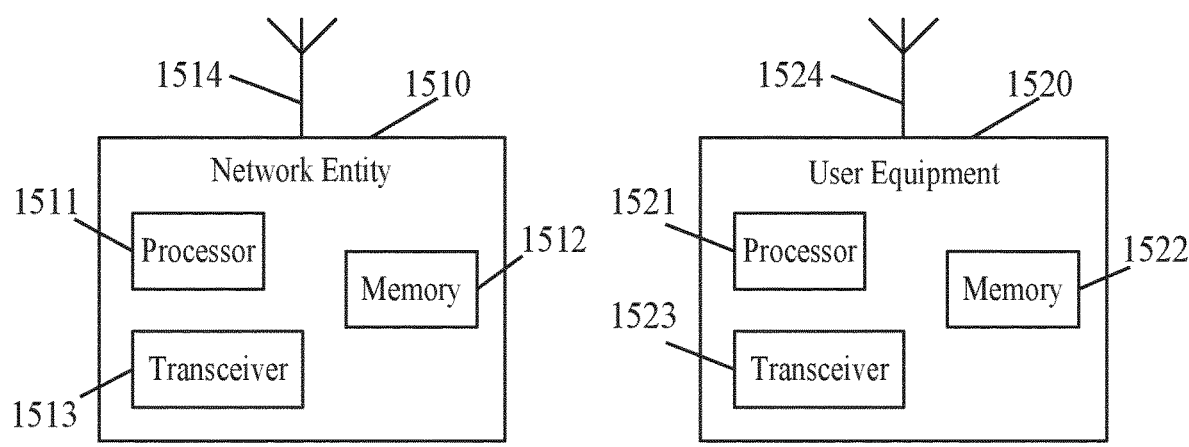
FIG. 15 illustrates an example of various network devices according to some embodiments.

FIG. 7 illustrates an example of a signaling diagram. NE 710 may be similar to NE 1510, as illustrated in FIG. 15, according to certain embodiments. As an example, NE 710 may be a repository entity in a mobile communication network, such as a UDR with receiving circuitry, storing circuitry, adding circuitry, and/or transmitting circuitry. At 701, NE 710 may receive first information on data related to NE 720, which may also be similar to NE 1510 illustrated in FIG. 15.

At 703, NE 710 may store second information related to NE 720 based on the first information. The second information may include an identifier of NE 720 and an identifier of a data acquiring entity, such as NE 1510 illustrated in FIG. 15, having acquired the data. In various embodiments, acquiring may include any processing having the data (or pointer to the data) as a result, including, but not limited to, reading, collecting, generating, receiving, retrieving, determining, investigating, ascertaining, calculating, detecting, getting, achieving, gaining, attaining, and obtaining the data. Accordingly, the data acquiring entity may include any processing entity having the data as a result, including, but not limited to, being configured to read, collect, generate, receive, retrieve, determine, investigate, ascertain, calculate, detect, get, achieve, gain, attain, and obtain the data.

With respect to storing the second information, the storing may further include adding, if an entry related to NE 720 is already stored, a data set related to the data acquiring entity having acquired the data to the stored entry related to NE 720. Additionally or alternatively, an information retrieval request may be received which is indicative of NE 720, and the second information may be transmitted to NE 720.

In certain embodiments, the second information may further include an analytics type of the data and/or the analytics type may be one of mobility analytics and communication analytics. Furthermore, data related to the network entity may include at least one data type of collected historical data related to the network entity, determined statistical data related to the network entity, and/or determined prediction data related to the network entity.

In various embodiments, the second information may also include indications on the availability of at least one data type of the data, and/or each indication on availability of at least one data type of the data is provided with a timestamp indicative of a time of acquiring the respective data type of the data. Additionally or alternatively, each indication on availability of at least one data type of the data may be provided with an indication of a period over which the respective data type of the data was acquired.

In various embodiments, NE 710 may be similar to a user data repository entity, a data repository entity connected to a network data analytics function entity, an analytics data repository entity, a network data analytics function entity, or a network repository function entity. Furthermore, NE 720 may be similar to a user equipment, similar to UE 1520 in FIG. 15, a group of user equipment, a network function entity, a set of network function entities, or a network slice. Additionally or alternatively, the data acquiring entity may be similar to a network data analytics function entity and/or a network function entity.

Figure 8:
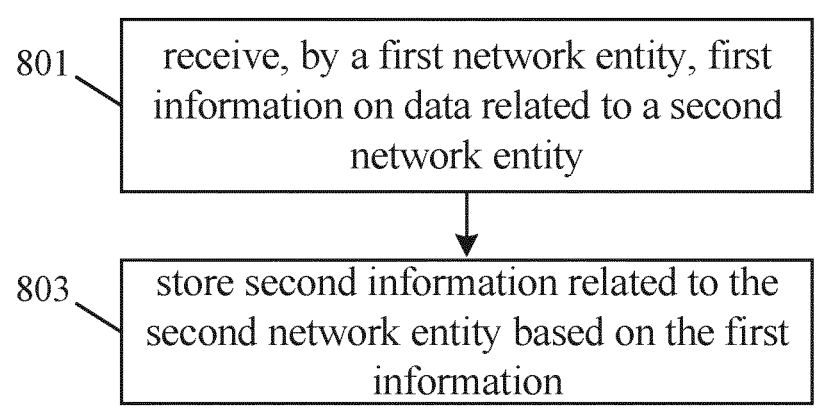
FIG. 8 illustrates an example of a flow diagram of a method according to various embodiments.

FIG. 8 illustrates an example of a flow diagram of a method that may be performed by a first NE, such as NE 1510 as illustrated in FIG. 15, according to certain embodiments. As an example, the first NE may be a repository entity in a mobile communication network, such as a UDR with receiving circuitry, storing circuitry, adding circuitry, and/or transmitting circuitry. At 801, the first NE may receive first information on data related to a second NE, which may also be similar to NE 1510 as illustrated in FIG. 15.

At 803, the first NE may store second information related to the second NE based on the first information. The second information may include an identifier of the second NE and an identifier of a data acquiring entity, such as NE 1510 illustrated in FIG. 15, having acquired the data. In various embodiments, acquiring may include any processing having the data (or pointer to the data) as a result, including, but not limited to, reading, collecting, generating, receiving, retrieving, determining, investigating, ascertaining, calculating, detecting, getting, achieving, gaining, attaining, and obtaining the data. Accordingly, the data acquiring entity may include any processing entity having the data as a result, including, but not limited to, being configured to read, collect, generate, receive, retrieve, determine, investigate, ascertain, calculate, detect, get, achieve, gain, attain, and obtain the data.

In various embodiments, the storing at 803 may further include adding, if an entry related to the second NE is already stored, a data set related to the data acquiring entity having acquired the data to the stored entry related to the second NE. Additionally or alternatively, an information retrieval request may be received indicative of the second NE, and second information related to the second NE may be transmitted.

In certain embodiments, the second information may further include an analytics type of the data and/or the analytics type may be one of mobility analytics and communication analytics. Furthermore, data related to the second NE may include at least one data type of collected historical data related to the second NE, determined statistical data related to the second NE, and/or determined prediction data related to the second NE.

In various embodiments, the second information may also include indications on the availability of at least one data type of the data, and/or each indication on availability of at least one data type of the data is provided with a timestamp indicative of a time of acquiring the respective data type of the data. Additionally or alternatively, each indication on availability of at least one data type of the data may be provided with an indication of a period over which the respective data type of the data was acquired.

In various embodiments, the first NE may be similar to a user data repository entity, a data repository entity connected to a network data analytics function entity, an analytics data repository entity, a network data analytics function entity, or a network repository function entity. Furthermore, the second NE may be similar to a user equipment, similar to UE 1520 in FIG. 15, a group of user equipment, a network function entity, a set of network function entities, or a network slice. Additionally or alternatively, the data acquiring entity may be similar to a network data analytics function entity and/or a network function entity.

Figure 9:
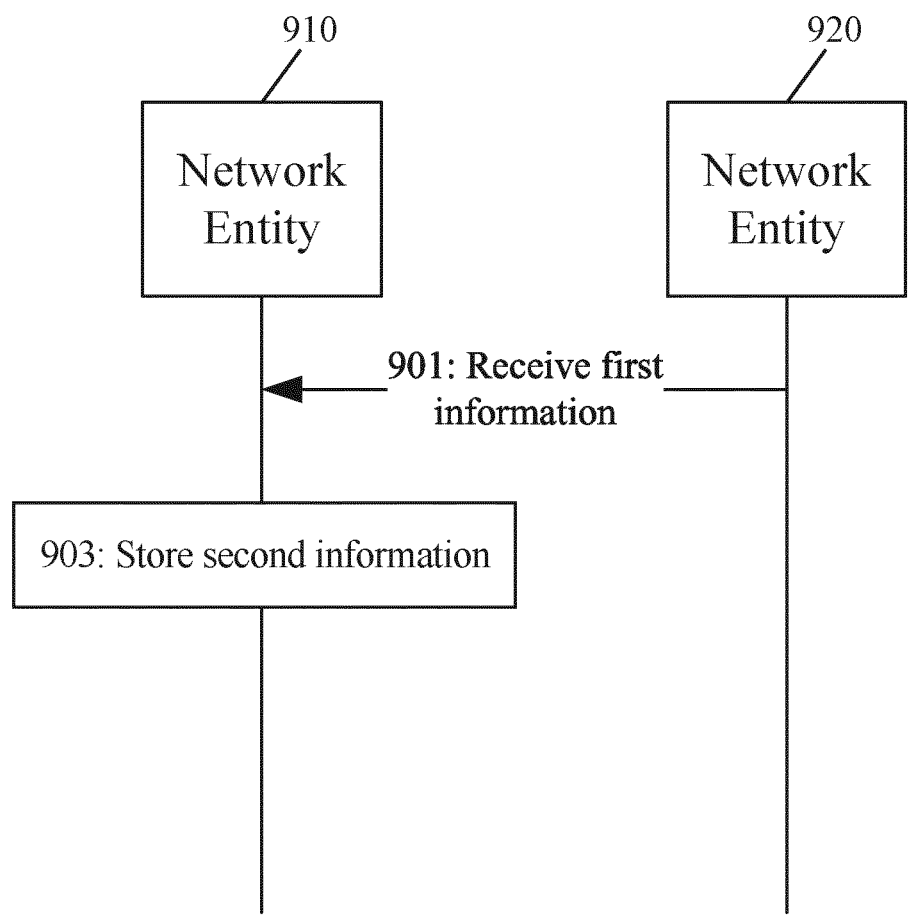
FIG. 9 illustrates an example of a signaling diagram according to certain embodiments.

FIG. 9 illustrates an example of a signaling diagram. NE 910 may be similar to NE 1510, as illustrated in FIG. 15, according to certain embodiments. As an example, NE 910 may be a repository entity in a mobile communication network, such as a UDR with receiving circuitry, storing circuitry, adding circuitry, and/or transmitting circuitry. At 901, NE 910 may receive first information on data related to NE 920, which may also be similar to NE 1510 illustrated in FIG. 15.

At 903, NE 910 may store second information related to NE 920 based on the first information. The second information may include an identifier of NE 920 and/or at least one pointer to a storage location of the data. Furthermore, NE 910 may receive an information retrieval request indicative of NE 920, and/or transmit at least one pointer related to NE 920.

In various embodiments, each of the at least one pointers may include an identifier of a data acquiring entity, such as NE 1510 illustrated in FIG. 15, having acquired the data. Acquiring may include any processing having the data (or pointer to the data) as a result, including, but not limited to, reading, collecting, generating, receiving, retrieving, determining, investigating, ascertaining, calculating, detecting, getting, achieving, gaining, attaining, and obtaining the data. Accordingly, the data acquiring entity may include any processing entity having the data as a result, including, but not limited to, being configured to read, collect, generate, receive, retrieve, determine, investigate, ascertain, calculate, detect, get, achieve, gain, attain, and obtain the data.

In certain embodiments, the storing at 903 may further include adding, if an entry related to NE 920 is already stored, a data set related to the data acquiring entity having acquired the data to the stored entry related to NE 920. Furthermore, each of the at least one pointer may include an analytics type of the data pointed to by the pointer. Additionally or alternatively, the analytics type may be one of mobility analytics and communication analytics, and/or each of the at least one pointer may include a data type of the data pointed to by the pointer. As an example, the data type may be one of collected historical data related to NE 920, determined statistical data related to NE 920, and/or determined prediction data related to NE 920.

In certain embodiments, NE 910 may be similar to a user data repository entity, a data repository entity connected to a network data analytics function entity, an analytics data repository entity, a network data analytics function entity, or a network repository function entity. Similarly, NE 920 may be similar to a user equipment, a group of user equipment, a network function entity, a set of network function entities, or a network slice. The data acquiring entity may be similar to a network data analytics function entity and/or a network function entity.

Figure 10:
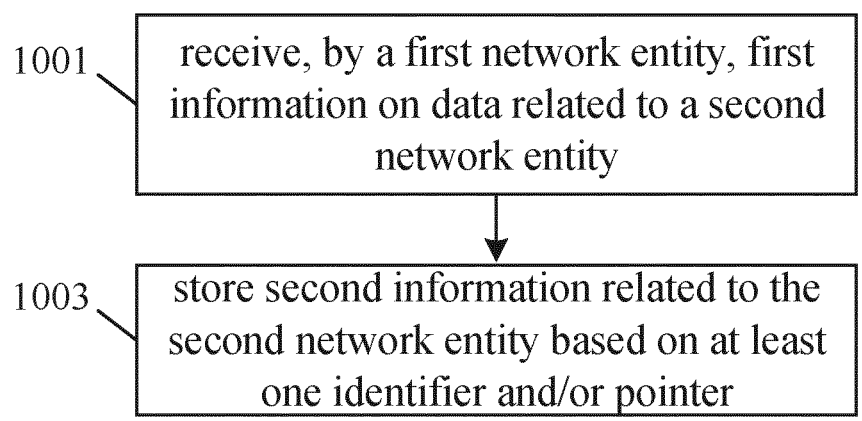
FIG. 10 illustrates an example of a flow diagram of a method according to various embodiments.

FIG. 10 illustrates an example of a flow diagram of a method that may be performed by a first NE, such as NE 1510 illustrated in FIG. 15, according to various embodiments. As an example, the first NE may be a repository entity in a mobile communication network, such as a UDR with receiving circuitry, storing circuitry, adding circuitry, and/or transmitting circuitry. At 1001, the first NE may receive first information on data related to a second NE, which may also be similar to NE 1510 illustrated in FIG. 15.

At 1003, the first NE may store second information related to the second NE based on the first information. The second information may include an identifier of the second NE and/or at least one pointer to a storage location of the data. Furthermore, the first NE may receive an information retrieval request indicative of the second NE, and/or transmit at least one pointer related to the second NE.

In various embodiments, each of the at least one pointers may include an identifier of a data acquiring entity, such as NE 1510 illustrated in FIG. 15, having acquired the data. Acquiring may include any processing having the data (or pointer to the data) as a result, including, but not limited to, reading, collecting, generating, receiving, retrieving, determining, investigating, ascertaining, calculating, detecting, getting, achieving, gaining, attaining, and obtaining the data. Accordingly, the data acquiring entity may include any processing entity having the data as a result, including, but not limited to, being configured to read, collect, generate, receive, retrieve, determine, investigate, ascertain, calculate, detect, get, achieve, gain, attain, and obtain the data.

In certain embodiments, the storing at 1003 may further include adding, if an entry related to the second NE is already stored, a data set related to the data acquiring entity having acquired the data to the stored entry related to the second NE. Furthermore, each of the at least one pointer may include an analytics type of the data pointed to by the pointer. Additionally or alternatively, the analytics type may be one of mobility analytics and communication analytics, and/or each of the at least one pointer may include a data type of the data pointed to by the pointer. As an example, the data type may be one of collected historical data related to the second NE, determined statistical data related to the second NE, and/or determined prediction data related to the second NE.

In certain embodiments, the first NE may be similar to a user data repository entity, a data repository entity connected to a network data analytics function entity, an analytics data repository entity, a network data analytics function entity, or a network repository function entity. Similarly, the second NE may be similar to a user equipment, similar to UE 1520 in FIG. 15, a group of user equipment, a network function entity, a set of network function entities, or a network slice. The data acquiring entity may be similar to a network data analytics function entity and/or a network function entity.

Figure 11:
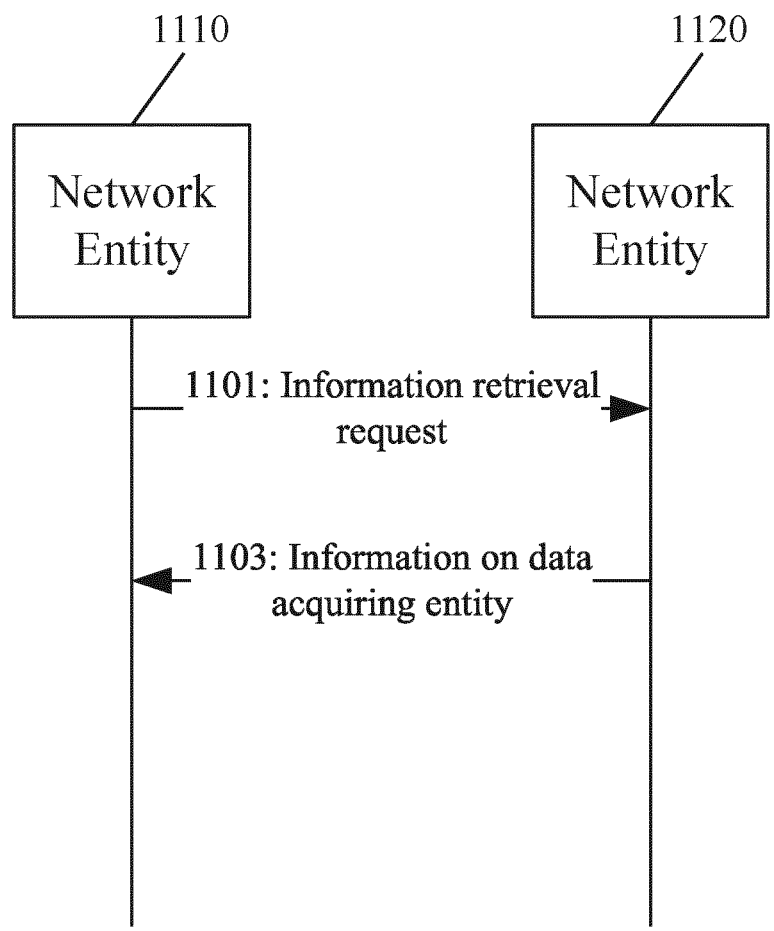
FIG. 11 illustrates an example of a signaling diagram according to certain embodiments.

FIG. 11 illustrates an example of a signaling diagram. NE 1110 may be similar to NE 1510, as illustrated in FIG. 15, according to certain embodiments. As an example, NE 1110 may be a network entity in a mobile communication network, such as an NWDAF, with transmitting circuitry and/or receiving circuitry. At 1101, NE 1110 may transmit to NE 1120, which may be a repository entity similar to NE 1510 illustrated in FIG. 15, an information retrieval request indicative of a network entity to be analyzed. The network entity may be similar to NE 1510, as illustrated in FIG. 15, according to some embodiments. Alternatively, at 1101, NE 1110 may transmit to NE 1120 an information retrieval request indicative of a second network entity to be analyzed.

At 1103, NE 1110 may receive from NE 1120 information on a data acquiring entity having acquired data related to the second network entity. The data acquiring entity may be similar to NE 1510, as illustrated in FIG. 15, according to certain embodiments. Acquiring may include any processing having the data (or pointer to the data) as a result, including, but not limited to, reading, collecting, generating, receiving, retrieving, determining, investigating, ascertaining, calculating, detecting, getting, achieving, gaining, attaining, and obtaining the data. Accordingly, the data acquiring entity may include any processing entity having the data as a result, including, but not limited to, being configured to read, collect, generate, receive, retrieve, determine, investigate, ascertain, calculate, detect, get, achieve, gain, attain, and obtain the data.

Alternatively, at 1103, NE 1110 may receive from NE 1120 at least one pointer to a storage location of the data related to the second network entity in response to NE 1110 transmitting to NE 1120 at 1101 an information retrieval request indicative of a second network entity to be analyzed.

In various embodiments, NE 1110 may be a network data analytics function entity or a network function entity. Furthermore, NE 1120 may be similar to a user data repository entity, a data repository entity connected to a network data analytics function entity, an analytics data repository entity, a network data analytics function entity, or a network repository function entity. In addition, the network entity may be similar to a user equipment, a group of user equipment, a network function entity, a set of network function entities, or a network slice, and/or the data acquiring entity may be similar to a network data analytics function entity or a network function entity.

Figure 12:
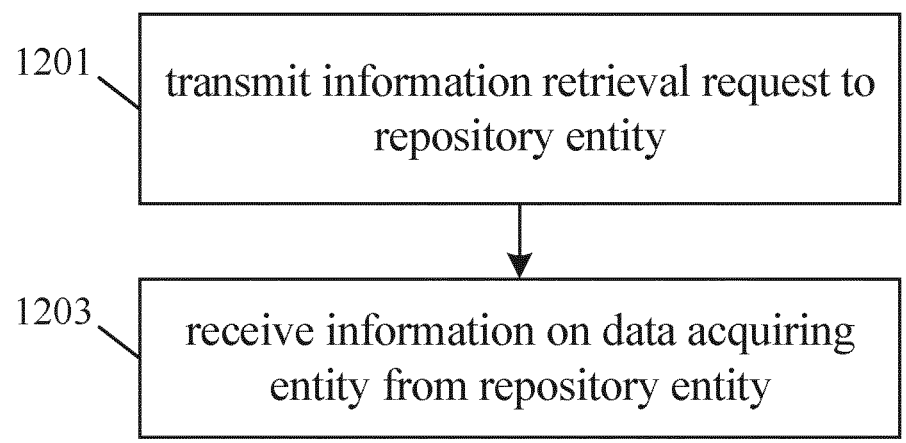
FIG. 12 illustrates an example of a flow diagram of a method according to various embodiments.

FIG. 12 illustrates an example of a flow diagram of a method that may be performed by a first NE, such as NE 1510 illustrated in FIG. 15, according to various embodiments. As an example, the first NE may be a network entity in a mobile communication network, such as an NWDAF, with transmitting circuitry and/or receiving circuitry. At 1201, the first NE may transmit to a second NE, which may be a repository entity similar to NE 1510 illustrated in FIG. 15, an information retrieval request indicative of a third NE to be analyzed. The third NE may also be similar to NE 1510, as illustrated in FIG. 15, according to certain embodiments. Alternatively, at 1201, the first NE may transmit to the second NE an information retrieval request indicative of the third NE to be analyzed.

At 1203, the first NE may receive from the second NE information on a data acquiring entity having acquired data related to the network entity. The data acquiring entity may be similar to NE 1510, as illustrated in FIG. 15, according to certain embodiments. Acquiring may include any processing having the data (or pointer to the data) as a result, including, but not limited to, reading, collecting, generating, receiving, retrieving, determining, investigating, ascertaining, calculating, detecting, getting, achieving, gaining, attaining, and obtaining the data. Accordingly, the data acquiring entity may include any processing entity having the data as a result, including, but not limited to, being configured to read, collect, generate, receive, retrieve, determine, investigate, ascertain, calculate, detect, get, achieve, gain, attain, and obtain the data.

Alternatively, at 1203, the first NE may receive from the second NE at least one pointer to a storage location of the data related to the third NE in response to the first NE transmitting to the second NE at 1201 an information retrieval request indicative of a third NE to be analyzed.

In various embodiments, the first NE may be a network data analytics function entity or a network function entity. Furthermore, the second NE may be similar to a user data repository entity, a data repository entity connected to a network data analytics function entity, an analytics data repository entity, a network data analytics function entity, or a network repository function entity. In addition, the third NE may be similar to a user equipment, similar to UE 1520 in FIG. 15, a group of user equipment, a network function entity, a set of network function entities, or a network slice, and/or the data acquiring entity may be similar to a network data analytics function entity or a network function entity.

Figure 13:
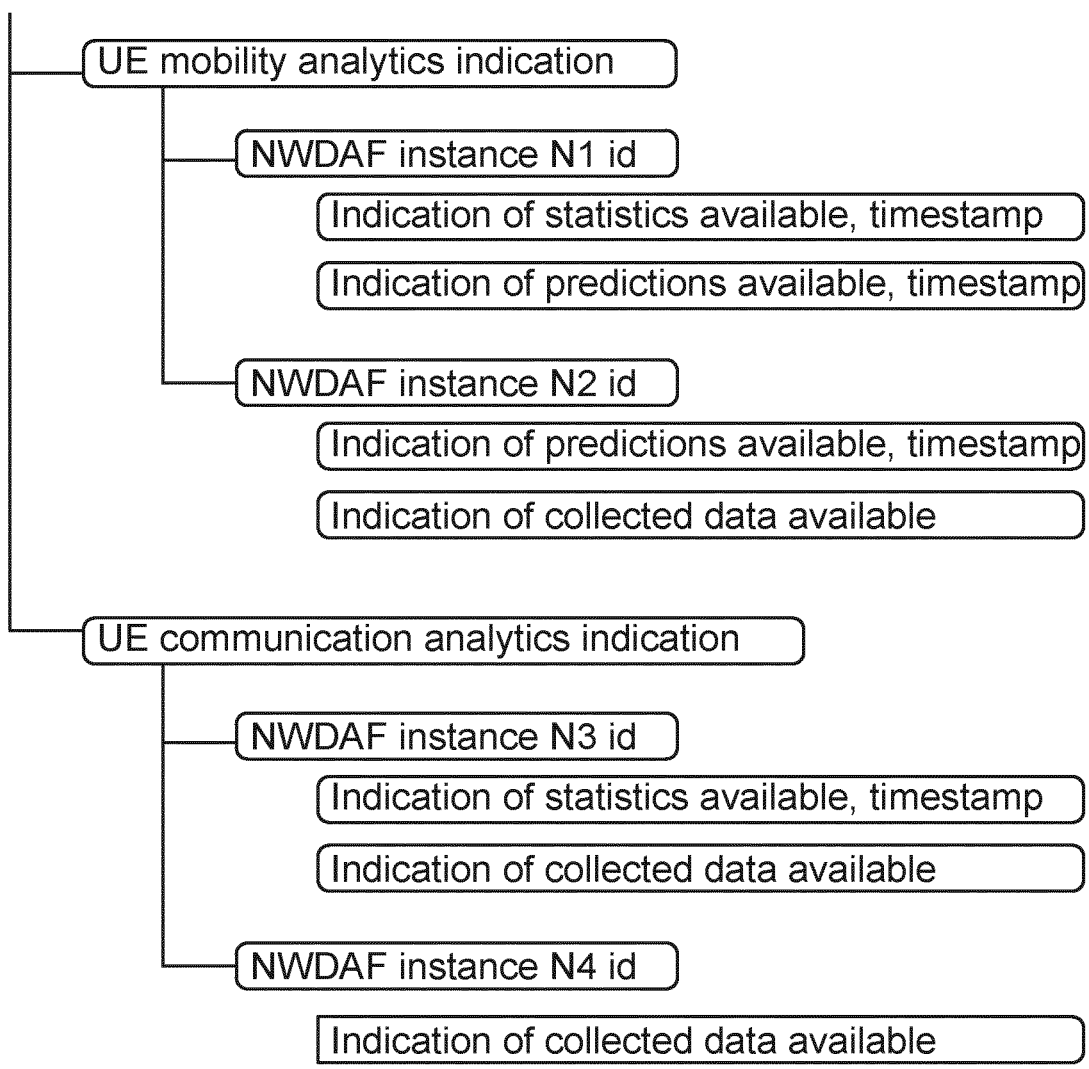
FIG. 13 illustrates a schematic diagram of a data structure representing a set of data stored in a repository according to some embodiments.

FIG. 13 illustrates a schematic diagram of a data structure representing a set of data stored in a repository according to some embodiments. In a deployment of multiple NWDAFs, several NWDAFs may perform data collection on similar types of data, and/or may derive the same analytics for the same UE. Certain embodiments described herein may avoid performance drawbacks by allowing any "NWDAF-x" to benefit from other NWDAFs by retrieving, from a central location, the identities of NWDAFs having useful information to retrieve from, and then "NWDAF-x" retrieving the information from these other NWDAFs. As mentioned above, a pointer concept may be applied on specific data for analytics purposes. For example, instead of storing NWDAF entities, an alternative may include storing per UE pointers to analytics and/or pointers to collected data. This may be done in the UDR, in a dedicated (central) NWDAF, and/or in an external repository. Alternatively or additionally, a third party may provide this service. Various embodiments described throughout are not limited to the exemplary storage locations.

Figure 14:
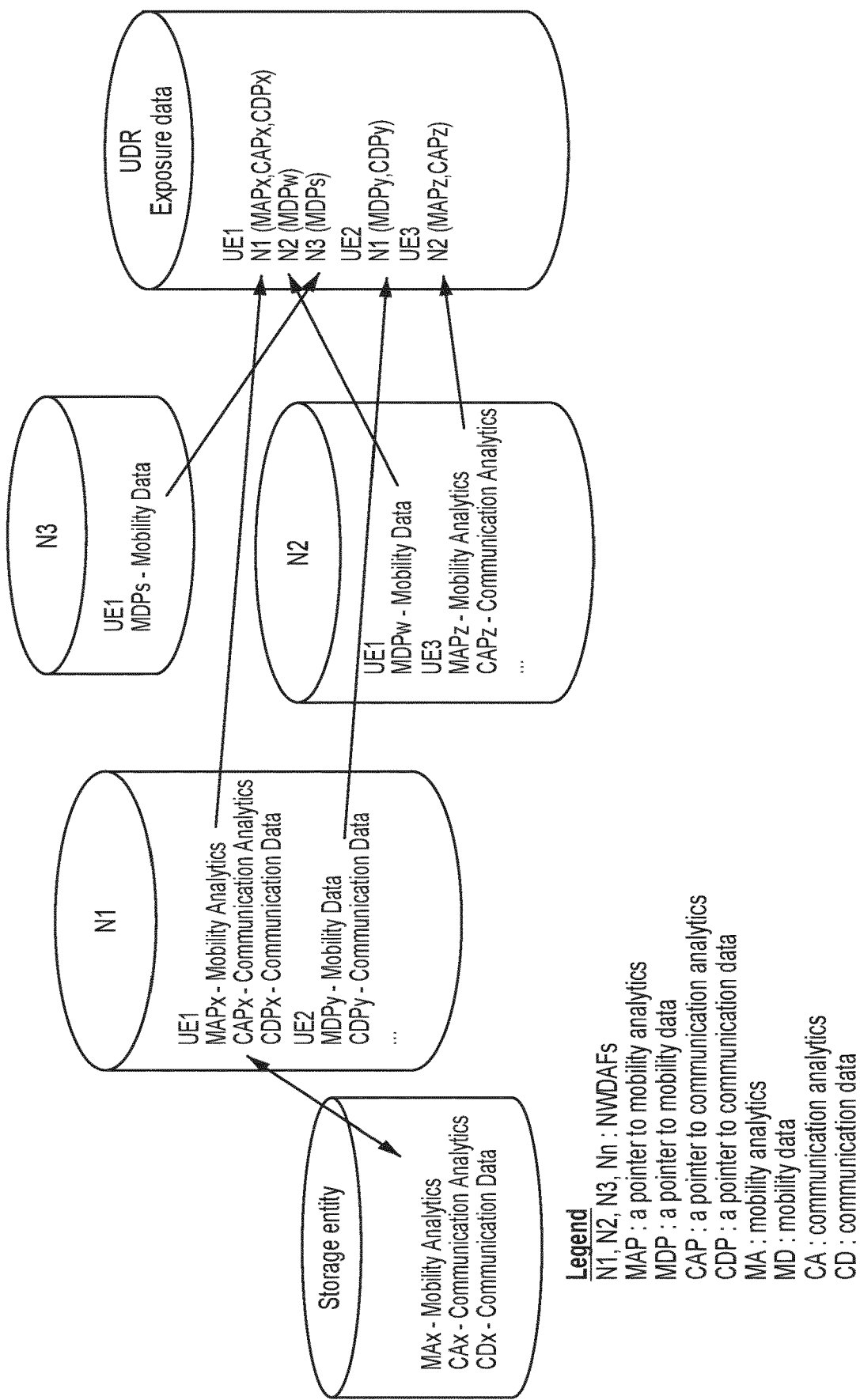
FIG. 14 illustrates a schematic diagram of a data structure illustrating a pointer concept according to some embodiments.

FIG. 14 illustrates a schematic diagram of a data structure illustrating a pointer concept according to some embodiments. In this diagram, $N_1$, $N_2$, $N_3$, $N_n$ may correspond with NWDAFs; MAP may correspond with pointer to mobility analytics; MDP may correspond with pointer to mobility data; CAP may correspond with pointer to communication analytics; CDP may correspond with pointer to communication data; MA may correspond with mobility analytics; MD may correspond with mobility data; CA may correspond with communication analytics; and CD may correspond with communication data. NWDAFs $N_1$, $N_2$, and $N_3$ may store in UDR pointers (or references) to the analytics data or to the collected data. The analytics data or collected data may be stored in $N_1$, $N_2$ or $N_3$ themselves, but may be stored elsewhere. Any NWDAF $N_n$ performing mobility analytics on UE1 may first check in UDR whether there are mobility analytics for this UE1, and the NWDAF $N_n$ may get the pointer to NWDAF $N_1$ and the pointer to NWDAF $N_2$. Then, NWDAF $N_n$ may contact NWDAF $N_1$ and/or NWDAF $N_2$ to retrieve the needed information. Multiple deployed NWDAFs may perform data collection on similar types of data and/or may derive the same analytics for the same UE. This may be an issue in terms of overall performance, and according to some embodiments, such performance drawbacks may be avoided (the load on NWDAF which possibly have to do the same treatments, may it be data collection or analytics generation, is reduced) by allowing any NWDAF $N_n$ to benefit from other NWDAFs.

In some embodiments, a Nudr service with NWDAF as the consumer for storing information in the UDR may be applied, such as where the Nudr service may be used by the NWDAF as a consumer in two cases. First, the storage of collecting data may be initiated. For example, whenever the NWDAF collects data (for analytics derivation purposes), the NWDAF may write into UDR the information that some data was collected, together with additional information. Secondly, the storage of deriving analytics may be initiated. Thus, whenever the NWDAF derives analytics, the NWDAF may write into UDR the information that some analytics were generated, together with additional information.

In various embodiments, a Nudr service with NWDAF as consumer for retrieving information from the UDR may be applied. For example, when a NWDAF entity is asked for analytics for a specific UE, one possible action would be for this NWDAF entity to check if another NWDAF entity has already collected data which could be used for deriving the requested analytics. The NWDAF may benefit from data already collected from other NFs, which data may not be available any longer from these NFs. Another possible action would be for this NWDAF entity to check if another NWDAF entity has already derived analytics, which could be used for deriving the requested analytics. The Nudr service may be used by NWDAF as a consumer in the two cases above.

In certain embodiments, information may be stored in a data repository connected to a specific NWDAF, which NWDAF may be contacted by other NWDAFs to retrieve available information. Additionally or alternatively, a specific data repository for analytics purpose may be used and/or such information may be stored in a network data analytics function entity. Furthermore, as mentioned above, while some embodiments are described with reference to a specific UE, the concept of the present invention may be extended to a group of UEs, with entries in UDR being listed on, for example, a per internal group ID basis.

Various embodiments are not restricted to UEs or groups of UEs, and may be applied to data collection or analytics generation related to network functions (NFs), NF sets, and slices. A NWDAF may store in a UDR the information that it has collected data for a specific NF, or that it has delivered analytics related to a specific NF (e.g., NF load analytics). The information in a UDR may be stored on a per NF instance ID entry. The NWDAF may store in a UDR the information that it has collected for a specific NF set, or that it has delivered analytics related to a specific NF set. The information in a UDR may then be stored on a per NF set ID entry. The NWDAF may store in a UDR the information that it has collected data for a specific slice, or that it has delivered analytics related to a specific slice (e.g., slice load level analytics, slice quality of experience (QoE) analytics). The information in a UDR would then be stored on a per single network slice selection assistance information (S-NS-SAI) entry. In certain embodiments, the NWDAF may store its own identities or the identity of another NWDAF or another NF.

FIG. 15 illustrates an example of a system according to certain example embodiments. In one example embodiment, a system may include multiple devices, such as, for example, NE 1510 and/or UE 1520.

NE 1510 may be one or more of a data acquiring entity, such as a network data analytics function entity and/or network function entity, a base station, such as an eNB or gNB, a serving gateway, a server, and/or any other access node or combination thereof. Furthermore, NE 1510 and/or UE 1520 may be one or more of a citizens broadband radio service device (CBSD).

Additionally or alternatively, NE 1510 may be a repository entity, such as a user data repository entity, a data repository entity connected to a network data analytics function entity, an analytics data repository entity, a network data analytics function entity, and/or a network repository function entity. NE 1510 may also be similar to UE 1520, described below.

Furthermore, NE 1510 may be a repository entity in a mobile communication network, such as a unified data repository (UDR) having receiving circuitry and storing circuitry.

UE 1520 may include one or more of at least one network function entity, at least one network slice, at least one mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 1510 and/or UE 1520 may include at least one processor, respectively indicated as 1511 and 1521. Processors 1511 and 1521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1512 and 1522. The memory may be fixed or removable. The memory may include computer program instructions or computer code contained therein. Memories 1512 and 1522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1511 and 1521, memories 1512 and 1522, and any subset thereof, may be configured to provide means corresponding to the various blocks of FIGS. 7-14. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 15, transceivers 1513 and 1523 may be provided, and one or more devices may also include at least one antenna, respectively illustrated as 1514 and 1524. The device may have many antennas, such as an array of antennas configured for multiple input multiple output (MIMO) communications, or multiple antennas for multiple RATs. Other configurations of these devices, for example, may be provided. Transceivers 1513 and 1523 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 7-14). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 7-14. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 16:
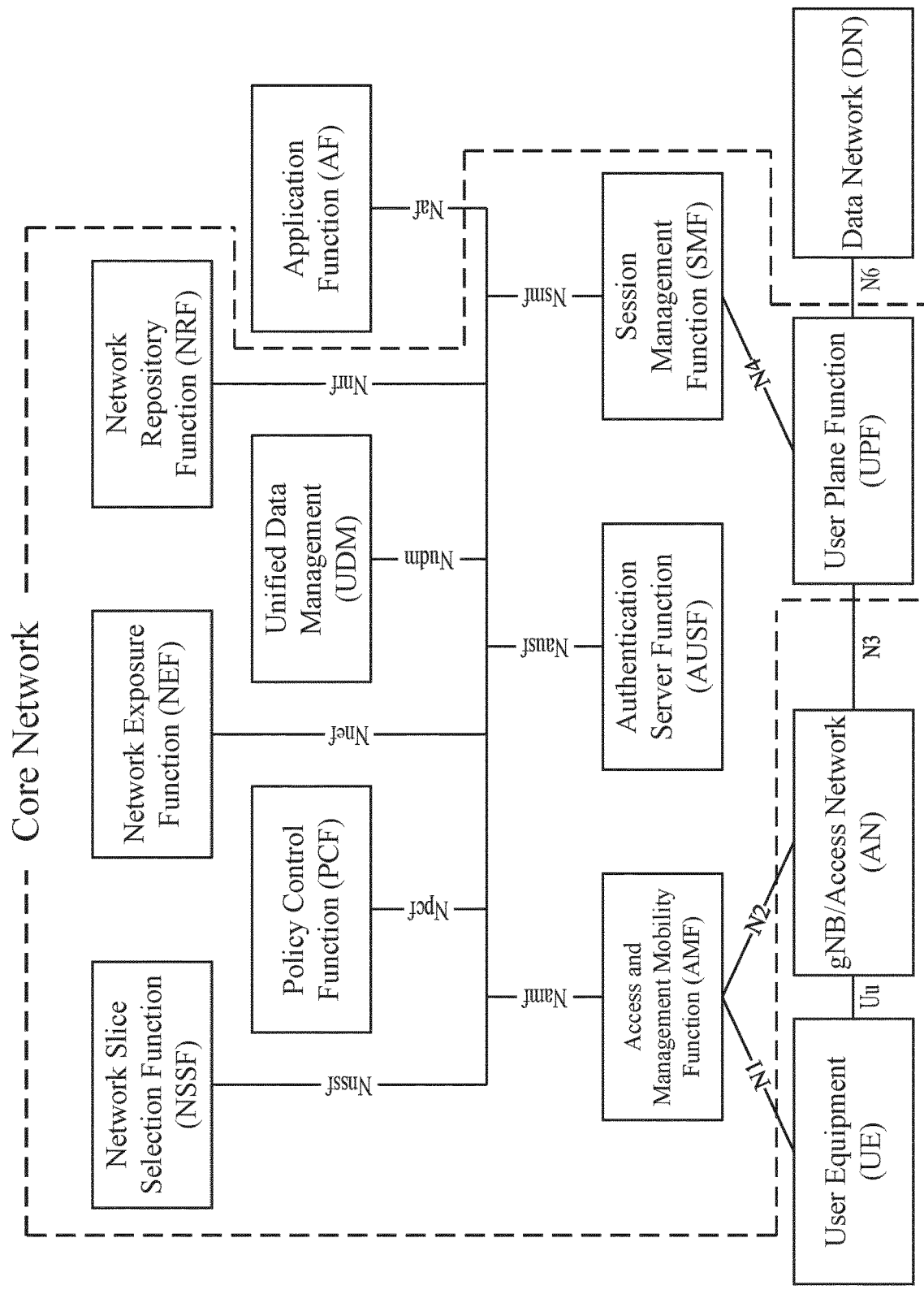
FIG. 16 illustrates an example of a 5G network and system architecture according to certain embodiments.

FIG. 16 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 16 may be similar to NE 1510 and UE 1520, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary
3GPP Third Generation Partnership Project
5G Fifth Generation
5GC Fifth Generation Core
5GS Fifth Generation System
AF Application Function
AMF Access and Mobility Management Function
ASIC Application Specific Integrated Circuit
BS Base Station
CA Communication Analytics
CAP Pointer to Communication Analytics
CBSD Citizens Broadband Radio Service Device
CD Communication Data
CDP Pointer to Communication Data
CE Control Elements
CN Core Network
CPU Central Processing Unit
DMRS Demodulation Reference Signal
DRB Data Radio Bearer
DU Distributed Unit
eMBB Enhanced Mobile Broadband
eMTC Enhanced Machine Type Communication
eNA Enablers for Network Automation
eNB Evolved Node B
EPS Evolved Packet System
FQDN Fully Qualified Domain Name
gNB Next Generation Node B
GPS Global Positioning System
HDD Hard Disk Drive
IoT Internet of Things
IP Internet Protocol
LTE Long-Term Evolution
LTE-A Long-Term Evolution Advanced
MAC Medium Access Control
MAP Pointer to Mobility Analytics
MBS Multicast and Broadcast Systems
MCS Modulation and Coding Scheme
MD Mobility Data
MDP Pointer to Mobility Data
MEMS Micro Electrical Mechanical System
MIMO Multiple Input Multiple Output
MME Mobility Management Entity
mMTC Massive Machine Type Communication
MTC Machine Type Communication
NAS Non-Access Stratum
NB-IoT Narrowband Internet of Things
NE Network Entity
NEF Network Exposure Function
NF Network Function
NG Next Generation
NG-eNB Next Generation Evolved Node B
NG-RAN Next Generation Radio Access Network
NR New Radio
NRF Network Repository Function
NR-U New Radio Unlicensed
NSSF Network Slice Selection Function
NWDAF Network Data Analytics Functions
OAM Operation, Administrative, and Maintenance
PCF Policy Control Function
PDA Personal Digital Assistance
PDF Packet Flow Descriptions
PDU Protocol Data Unit
PLMN Public Land Mobile Network
PRB Physical Resource Block
QoE Quality of Experience
OAM Operation, Administration, and Maintenance
QoS Quality of Service
RAM Random Access Memory
RAN Radio Access Network
RAT Radio Access Technology
RE Resource Element
REL Release
RLC Radio Link Control
RRC Radio Resource Control
RS Reference Signal
SMF Session Management Function
S-NSSAI Single Network Slice Selection Assistance Information
TR Technical Report
TS Technical Specification
UDM Unified Data Management
UDR User Data Repository
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. A user data repository entity of a mobile communication network, comprising:
at least one processor; and
at least one memory including computer program code,
wherein the at least one memory and the computer program code are configured to, with the at least one processor, cause the user data repository entity at least to:

receive first information on data related to one or more user equipments;
store, to an entry, second information related to the one or more user equipments based on the first information, wherein the second information comprises at least one of:
an identifier of the one or more user equipments, and
at least one of an identifier of a network analytics function having acquired the data and at least one pointer to a storage location of the data; and
add, responsive to determining that the entry related to the one or more user equipments is already stored, a data set to the entry, wherein the data set is related to another network analytics function that has acquired additional data related to the one or more user equipments.

2. The user data repository entity of claim 1, wherein the second information further comprises an analytics type of the data.

3. The user data repository entity of claim 1, wherein an analytics type of the data is one of mobility analytics and communication analytics.

4. The user data repository entity of claim 1, wherein the data related to the one or more user equipments comprises at least one data type of:
collected historical data related to the one or more user equipments;
determined statistical data related to the one or more user equipments; and
determined prediction data related to the one or more user equipments.

5. The user data repository entity of claim 1, wherein the second information further comprises indications on availability of at least one data type of the data.

6. The user data repository entity of claim 1, wherein at least one of:
each indication on availability of at least one data type of the data is provided with a timestamp indicative of a time of acquiring the respective data type of the data; and
each indication on availability of at least one data type of the data is provided with an indication of a period over which the respective data type of the data was acquired.

7. The user data repository entity of claim 1, wherein the at least one memory and the computer program code are further configured to, with the at least one processor, cause the user data repository entity at least to:
receive an information retrieval request indicative of the one or more user equipments; and
transmit the second information related to the one or more user equipments.

8. The user data repository entity of claim 1, wherein each of the at least one pointer comprises the identifier of the network analytics function having acquired the data.

9. The user data repository entity of claim 1, wherein each of the at least one pointer comprises an analytics type of the data pointed to by the pointer.

10. The user data repository entity of claim 9, wherein the analytics type of the data is one of mobility analytics and communication analytics.

11. The user data repository entity of claim 1, wherein each of the at least one pointer comprises a data type of the data pointed to by the pointer.

12. The user data repository entity of claim 11, wherein the data comprises at least one data type of:
collected historical data related to the one or more user equipments;
determined statistical data related to the one or more user equipments; and
determined prediction data related to the one or more user equipments.

13. The user data repository entity of claim 8, wherein the at least one memory and the computer program code are further configured to, with the at least one processor, cause the user data repository entity at least to:
receive an information retrieval request indicative of the one or more user equipments; and
transmit the second information related to the one or more user equipments.

14. A network data analytics function entity, comprising:
at least one processor; and
at least one memory including computer program code,
wherein the at least one memory and the computer program code are configured to, with the at least one processor, cause the network data analytics function entity at least to:
transmit, to a user data repository entity, an information retrieval request indicative of one or more user equipments to be analyzed; and at least one of:
receive, from the user data repository entity, an entry comprising both information acquired by a network analytics function related to the one or more user equipments and information acquired by another network analytics function related to the one or more user equipments; and
receive, from the user data repository entity, an entry comprising a plurality of pointers to a plurality of storage locations of the data related to the one or more user equipments, wherein a respective pointer of the plurality of pointers further comprises an analytics type of the data pointed to by the respective pointer or a data type of the data pointed to by the pointer selected from the group consisting of historical data, statistical data or prediction data.

15. A method, comprising:
receiving, by a user data repository entity in a mobile communication network, first information on data related to one or more user equipments;
storing, by the user data repository entity in the mobile communication network, to an entry, second information related to the one or more user equipments based on the first information, wherein the second information comprises at least one of:
an identifier of the one or more user equipments, and
an identifier of a network analytics function having acquired the data and at least one pointer to a storage location of the data; and
adding, responsive to determining that the entry related to the one or more user equipments is already stored, a data set to the entry, wherein the data set is related to another network analytics function that has acquired additional data related to the one or more user equipments.

* * * * *